(12) United States Patent
Skjoldborg

(10) Patent No.: US 9,973,607 B2
(45) Date of Patent: May 15, 2018

(54) HEADSET ADAPTER AND A HEADSET SYSTEM

(71) Applicant: GN Audio A/S, Ballerup (DK)

(72) Inventor: Erling Skjoldborg, Ballerup (DK)

(73) Assignee: GN AUDIO A/S (DK)

(*) Notice: Subject to any disclaimer, the term of this patent is extended or adjusted under 35 U.S.C. 154(b) by 0 days. days.

(21) Appl. No.: 15/496,733

(22) Filed: Apr. 25, 2017

(65) Prior Publication Data

US 2017/0318142 A1 Nov. 2, 2017

(30) Foreign Application Priority Data

Apr. 28, 2016 (EP) ..................................... 16167569

(51) Int. Cl.
*H04M 1/00* (2006.01)
*H04M 1/60* (2006.01)
(Continued)

(52) U.S. Cl.
CPC ..... *H04M 1/6066* (2013.01); *H04M 1/72527* (2013.01); *H04R 1/1091* (2013.01);
(Continued)

(58) Field of Classification Search
CPC ............. H04M 1/6058; H04M 1/6033; H04M 1/72527; H04R 1/10; H04R 1/342; H04R 3/00; H04R 5/033; H04R 2201/107
(Continued)

(56) References Cited

U.S. PATENT DOCUMENTS 6,735,453 B1* 5/2004 Bobisuthi ........... H04M 1/6033
455/569.1
7,010,332 B1* 3/2006 Irvin ....................... H04M 1/05
455/575.2
(Continued)

FOREIGN PATENT DOCUMENTS

EP 1455477 9/2004
EP 2645682 10/2013

OTHER PUBLICATIONS

European Search Report dated Oct. 6, 2016 for European patent application No. 16167569.

*Primary Examiner* — Quochien B Vuong
(74) *Attorney, Agent, or Firm* — Altera Law Group, LLC

(57) ABSTRACT

A headset adapter and a headset system for voice communication comprising a headset and a headset adapter as well as a method of enabling microphone transmission to a host device are provided. The headset comprises at least one earphone having a headset speaker, a headset microphone and a headset transceiver, the headset adapter being configured to interconnect the headset and a host device, the headset adapter comprising an adapter processor, a host interface, such as a host interface interconnecting the adapter processor and the host device, an adapter transceiver configured to establish a wireless communication link with the headset. The adapter furthermore comprises a controller configured to enable and disable the headset microphone. The adapter processor is configured to receive a request for headset microphone activation or microphone deactivation, for example from the host interface, and in response to receiving the request providing a control signal to the controller to enable or disable the headset microphone. The controller may thus activate the transceiver to configure the wireless communication link with the headset.

15 Claims, 4 Drawing Sheets

(51) Int. Cl.
*H04W 76/02* (2009.01)
*H04M 1/725* (2006.01)
*H04W 4/00* (2018.01)
*H04R 1/08* (2006.01)
*H04M 1/253* (2006.01)
*H04R 1/10* (2006.01)

(52) U.S. Cl.
CPC ............ *H04W 4/008* (2013.01); *H04W 4/80* (2018.02); *H04W 76/023* (2013.01); *H04W 76/14* (2018.02); *H04M 1/2535* (2013.01); *H04M 1/6008* (2013.01); *H04M 2250/02* (2013.01); *H04M 2250/08* (2013.01); *H04R 1/08* (2013.01); *H04R 1/1041* (2013.01); *H04R 2201/107* (2013.01); *H04R 2420/07* (2013.01)

(58) Field of Classification Search
USPC ............ 455/556.1, 557, 569.1, 575.1, 575.2
See application file for complete search history.

(56) References Cited

U.S. PATENT DOCUMENTS

| | | | |
|---|---|---|---|
| 7,283,635 B1* | 10/2007 | Anderson | H04M 1/60 |
| | | | 455/575.2 |
| 8,190,217 B2* | 5/2012 | Slevin | H04M 1/6066 |
| | | | 455/575.2 |
| 8,755,845 B2 | 6/2014 | Clark et al. | |
| 2002/0016188 A1* | 2/2002 | Kashiwamura | H04M 1/6033 |
| | | | 455/575.2 |
| 2011/0306393 A1 | 12/2011 | Goldman et al. | |
| 2013/0170665 A1 | 7/2013 | Wise et al. | |

* cited by examiner

40

41 — Receiving a request for headset microphone activation, in the headset adapter;

42 — Decoding the request in an adapter processor;

43 — Providing a control signal to the transceiver

44 — activating the transceiver to configure the wireless communication link with the headset according to the control signal and enabling the headset microphone in accordance with the control signal.

Fig. 4 ical field

The present invention relates generally to headset systems, headset adapters, and methods of using these. More specifically, a headset adapter for interconnecting a host device, such as a computer, a smartphone, etc., and a headset, a system for voice communication comprising a headset adapter and a headset, and a method of enabling microphone transmission to the host device are disclosed.

BACKGROUND OF THE INVENTION

Headsets are widely used, both in office settings, and while listening to music or entertainment anywhere. Typically, headsets are connected to host devices, such as computers, smart phones, gaming stations, etc.

The headsets may be used in call-centers, in office spaces, and they may be used for voice communication over a telecommunication network, via a wireless network, via softphone applications executed at the host devices, etc.

The headsets may generally be used in a variety of environments enabling interaction between a user and an application executed at a host device, such as for example softphone applications, voice recognition applications, language or speech learning applications, gaming application, audio or video applications, etc.

The headsets may be wired or wireless, and they may connect to the host device via an adapter, such as a headset base station or other adapter. Wireless headsets typically receive power from small built-in batteries, such as from small built-in rechargeable batteries, and thus in order to save power, and thereby increase the lifetime of the batteries between chargings, wireless headsets, and thus the communication link to the adapter or base station, are turned off when not in use.

Typically, the user then activates the headset when the user needs the headset, for example by removing the headset from a hook of a base station or similar. In some embodiments, for example in telephony applications, a specific Human Interface Device, HID, is provided, allowing for e.g. hook on and hook off requests being send to the headset via the HID, and the adapter.

In some examples, see e.g. U.S. Pat. No. 8,755,845, it is suggested that the user may launch a software program or application on a host device by activating a program activation mechanism provided on the headset. There may be provided one or more program activation mechanisms on the headset, each being configured to automatically activate a corresponding application program on the host device via a headset base and a headset integrator application executed at the host device.

SUMMARY

It is an object of the present invention to improve the functionality of headsets interacting with host device applications According to a first aspect, a headset system for voice communication comprising a headset and a headset adapter is provided, the headset comprising at least one earphone having a headset speaker, a headset microphone and a headset transceiver, the headset adapter being configured to interconnect the headset and a host device, the headset adapter comprising an adapter processor, a host interface, such as a host interface interconnecting the adapter processor and the host device, an adapter transceiver configured to establish a wireless communication link with the headset, a controller configured to enable and disable the headset microphone. The adapter processor is configured to receive a request for headset microphone activation or microphone deactivation, for example from the host interface, and in response to receiving the request providing a control signal to the controller to enable or disable the headset microphone. The controller may thus activate the transceiver to configure the wireless communication link with the headset. The wireless communication link may thus be configured in accordance with the control signal.

According to another aspect, a headset adapter configured to interface a headset and a host device is provided, the headset adapter comprising an adapter processor, a host interface interconnecting the adapter processor and the host device, a transceiver configured to establish a wireless communication link with for example the headset, a controller configured to enable and disable a headset microphone. The adapter processor is configured to receive a request for headset microphone activation or microphone deactivation from the host interface, and in response to receiving the request providing a control signal to the controller to enable or disable the headset microphone, and activating the transceiver to configure the wireless communication link with the headset. The wireless communication link may thus be configured in accordance with the control signal.

According to a still further aspect a method of enabling or disabling microphone transmission to a host device using a headset adapter is provided, the headset adapter being configured to interconnect a headset having a headset microphone and the host device, the headset adapter comprising an adapter processor, a host interface interconnecting the adapter processor and the host device, a transceiver configured to establish a wireless communication link with the headset, a controller configured to enable and disable the headset microphone, the method comprising in the headset adapter, receiving a request for headset microphone activation or microphone deactivation via the host interface, providing a control signal to the controller to control the headset according to the instructions received, thus e.g. activating the transceiver to configure the wireless communication link with the headset, and e.g. controlling the headset to enable or disable the headset microphone.

It is an advantage of configuring the adapter processor to receive a request for headset microphone activation or deactivation from the host interface and in response hereto enable or disable the headset microphone. Hereby, the headset microphone may be activated automatically when an application being executed at the host computer needs, expects or allows for a voice or audio input from a user. Thus, the user does not need to manually activate the headset, when an application allows for voice or audio input from the user. Likewise, the headset microphone, and typically also the wireless communication link, may be deactivated automatically when the application is closed or terminated. This is especially advantageous as there today are a large variety of headsets on the market from numerous different manufacturers, each having their specific way of operating the user interfaces. Furthermore, headset user interfaces are typically small, having more options programmed to a few buttons, thus, it may be difficult for a user to know which buttons to operate for activation or deactivation of a specific function.

The headset adapter comprises a controller and upon receipt of a control signal indicating that a request, such as a request for enabling of e.g. a microphone, has been received, the controller may activate the transceiver to configure the wireless communication link with the headset, for example according to a protocol, such as according to a predetermined protocol, such as according to a protocol enabling headset microphone input to the headset adapter. The transceiver may in dependence of the received control signal establish a connection with the headset. The transceiver may in dependence of the received control signal terminate a connection with the headset. The transceiver may establish the connection according to a protocol.

The headset may be any wireless headset, such as a headset comprising a wireless communication unit, such as a transceiver. The wireless headset may be configured to communicate with the headset adapter via any wireless protocol, including DECT, WLAN, WI-FI, Bluetooth, Bluetooth LE, ZigBee, etc. The headset adapter has a corresponding communication unit, such as an adapter transceiver. Thus, the communication units, such as the headset transceiver and the adapter transceiver may thus be configured to communicate via any of these wireless protocols, and the communication link may be a communication link according to any of these wireless protocols.

In some embodiments, the adapter transceiver is configured to initiate establishment of the wireless communication link with the headset. However, it is envisaged that also the headset transceiver may initiate establishment of the wireless communication link.

The host interface interconnects the host device and the adapter processor, and the host interface is configured to receive and transmit audio data to and from the host device. The host interface may be a Universal Serial Bus, USB, interface, a firewire interface, IEEE 1395 interface or a Lightning interface.

The headset adapter including the host interface may be an audio class device, for example a USB audio class device, a firewire audio class device, etc. and may be used to input or output audio data.

In some embodiments in which the headset adapter comprises an audio class device, the host interface is specified according to audio class device definition, and the host interface is limited to receiving and sending instructions related to audio, including opening and closing of audio, muting and increasing or decreasing audio volume.

The headset adapter is configured to receive one or more requests from the host device, and the requests from the host device are typically received by the host interface.

In some embodiments the request(s) may be triggered by an application, such as an application software, executed on the host device. Hereby, for example headset microphone activation may be requested upon execution of an application at the host device. The application may be configured to receive for example voice input from a user of the application, and the application may for example upon execution send a request to the headset adapter, the request being received by the host interface. Hereby, the user may not need to activate the headset manually; rather, the headset may be activated automatically upon execution of the application.

In some embodiments, the request(s) may be triggered by termination of an application, such as by termination of an application software, which has been executed on the host device. Hereby, for example headset microphone de-activation may be requested upon termination of an application at the host device.

In response to receiving the request, the headset adapter may configure the wireless communication link to transmit audio from the headset microphone to the headset adapter. The audio may then via the host interface be provided to the host device as input.

Typically, upon receiving a request in the host interface, the request is provided to the adapter processor and a control signal corresponding to the request as received in the host interface is provided to the controller to control the headset according to the instructions received. In some embodiments, the control signal may be a control signal to enable the headset microphone. In some embodiments, the control signal may be a control signal to disable the headset microphone.

The controller may upon receiving the control signal to enable the headset microphone activate the transceiver to establish the wireless communication link with the headset.

The controller may be implemented in the adapter processor, or the controller may be a separate element. The controller may in some embodiments be implemented as a switching element, such as a switch.

The controller may be configured to enable and disable the headset speaker. The controller may be configured to activate the transceiver to establish or terminate a communication link with the headset.

The controller may be configured to activate the transceiver to establish or terminate a communication link with the headset. In some embodiments, the headset adapter may be configured to use a predetermined protocol for establishing the wireless communication link with the headset, the predetermined protocol being selected in dependence on the control signal received at the controller.

The controller may in response to receiving the control signal activate the transceiver to establish the wireless communication link with the headset, and the controller may furthermore in response to receiving the control signal initiate the wireless communication with the wireless headset via a protocol corresponding to the received control signal.

The protocol may be any protocol, such as a protocol configured to enable headset microphone communication, to disable the headset microphone, such as for example a protocol to enable audio communication via the headset speaker, to disable the headset speaker, or such as a protocol enabling communication via the headset speaker and the headset microphone. In some embodiments, the headset adapter may have a number of such predetermined protocols stored.

Thus, the request received by the headset adapter may comprise a request for microphone activation or de-activation; and a request for speaker activation or de-activation; or the request received by the headset adapter may comprise a request for microphone activation or de-activation; or a request for speaker activation or speaker de-activation. The headset adapter may be configured to select the corresponding protocol in dependence of the control signal, and thus in dependence of the request as received Hereby, also audio from an application executed on the host device may be provided to the user automatically upon activation or execution of the application at the host device without the user having to manually turn on the speaker and/or headset upon launching/execution of an application on the host device.

Thus, in some embodiments, the headset adapter may additionally or alternatively configure the wireless communication link to transmit audio obtained via the host interface to the headset speaker. The wireless communication link may be implemented using different protocols, and the protocols may include a DECT protocol, a Bluetooth protocol, etc. and the protocols may furthermore be configured for voice communication, for music transmission, etc. In one example, if the headset microphone is enabled or open, while the headset speaker is disabled or closed, typically a voice communication protocol would be selected, and mutatis mutandis a music or audio transmission protocol would be selected if only the headset speaker was enabled or open.

In some embodiments, the headset adapter is further configured to upon receipt of a request for deactivation of the headset microphone from the host interface, terminate the wireless communication link. The request for deactivation may be provided, e.g. when an application using the voice/audio is closed or terminated by a user. Hereby, the user may not need to turn off the headset upon termination of the program, thereby saving power of the wireless headset. In addition, the user may avoid receiving other sounds as emitted by the computer, such as alerts, etc. through the headset speaker.

In some embodiments, the headset adapter may be configured to maintain the wireless communication link upon termination of the application requesting the activation of the headset microphone. Thus, for example if a telephone call is initiated during execution of a first application, the request for audio is maintained, also upon termination of the first application.

In some embodiments, the headset adapter, the headset system and the method may be configured for enabling the headset microphone and thus establishing a wireless link between the headset adapter and the headset. In some embodiments, alternatively or additionally, the headset adapter, the headset system and the method may be configured for disabling the headset microphone and thus terminating a wireless link between the headset adapter and the headset.

BRIEF DESCRIPTION OF THE DRAWINGS

The embodiments will now be described more fully hereinafter with reference to the accompanying drawings, in which exemplary embodiments are shown. The claimed invention may, however, be embodied in different forms and should not be construed as limited to the embodiments set forth herein.

FIG. 4 is a flowchart illustrating a method of enabling a microphone.

DETAILED DESCRIPTION

Figure 1:
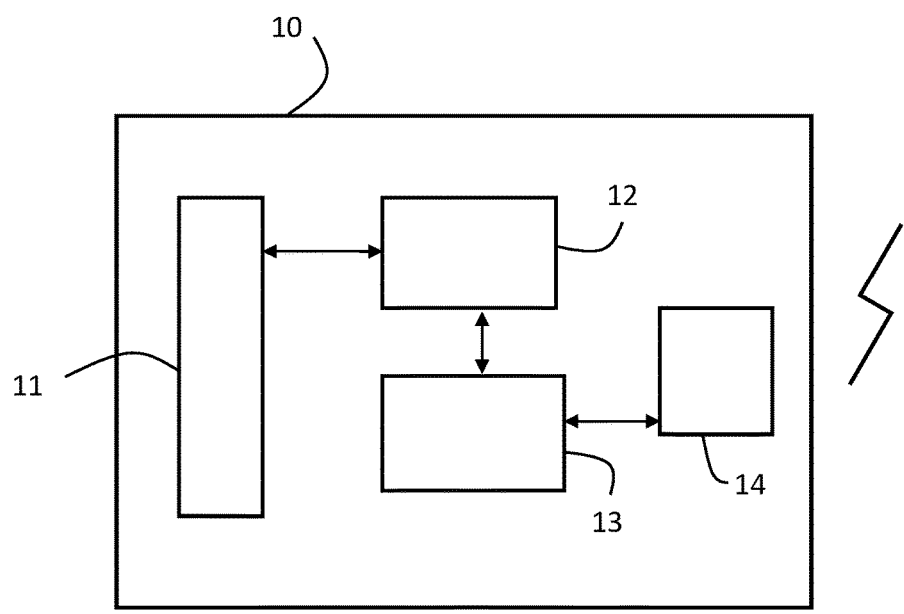
FIG. 1 shows a headset adapter.

Various embodiments are described hereinafter with reference to the figures. It should be noted that elements of similar structures or functions are represented by like reference numerals throughout the figures. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

In FIG. 1, a headset adapter 10 is shown, the headset adapter 10 comprises an adapter processor 12, a host interface 11 interconnecting the adapter processor 12 and a host device (not shown in FIG. 1), an adapter transceiver 14 configured to establish a wireless communication link with a headset (not shown in FIG. 1). The adapter processor 12 is configured to decode a request received via the host interface and provide a control signal for controller 13. The controller 13 is configured to enable and disable the headset microphone. The adapter processor 12 may thus receive a request for headset microphone activation from the host interface 11, and in response to receiving the request for headset microphone activation providing a control signal to the controller 13 to enable a headset microphone. The controller 13 may thus activate or request the adapter transceiver 14 to establish a wireless communication link with the headset.

Likewise, the adapter processor 12 may receive a request for headset microphone de-activation from the host interface 11, and in response to receiving the request for headset microphone de-activation providing a control signal to the controller 13 to disable a headset microphone. The controller 13 may thus activate or request the adapter transceiver 14 to terminate a wireless communication link with the headset.

Figure 2:
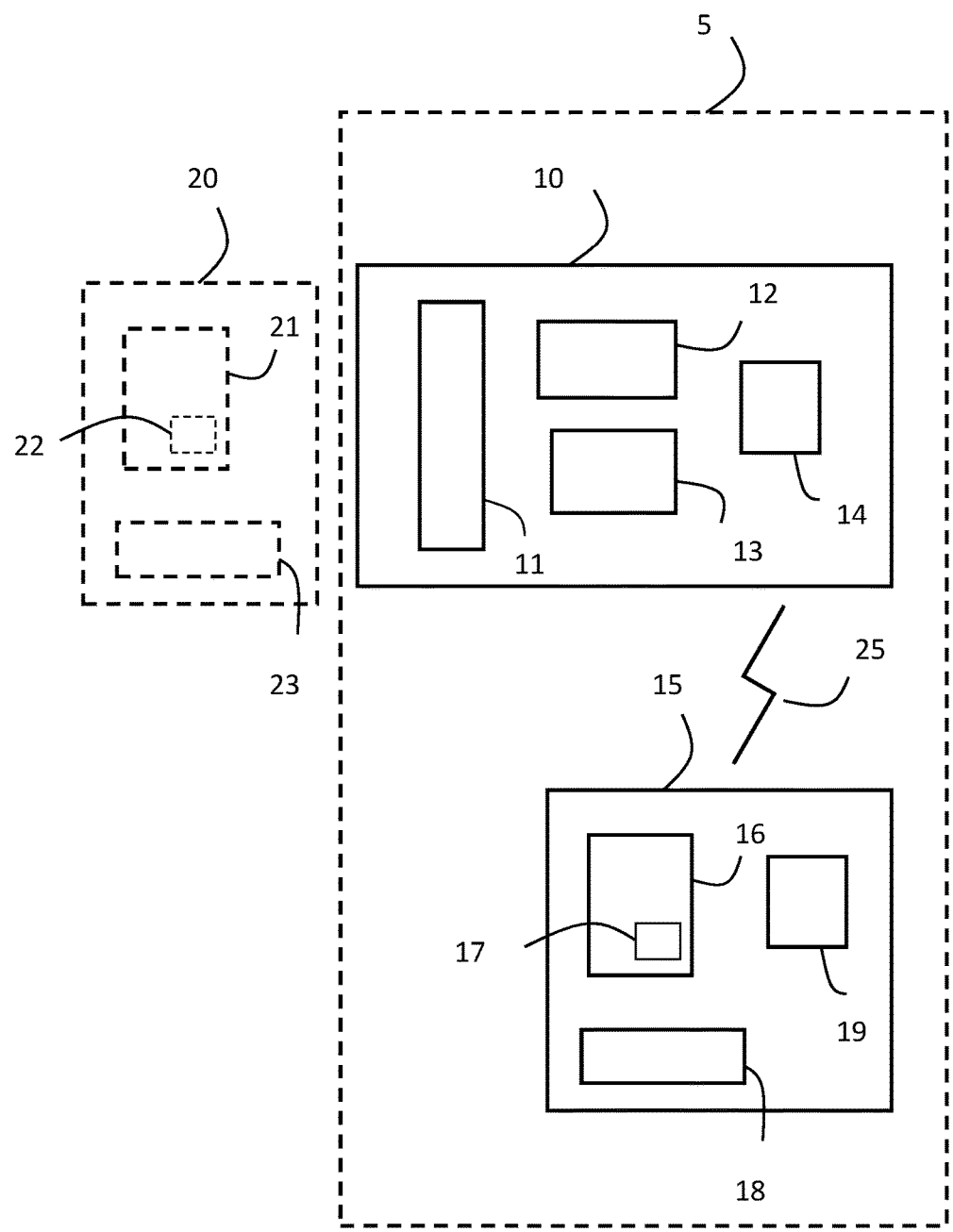
FIG. 2 shows a system comprising a headset adapter and a headset.

FIG. 2 shows a headset system 5 for voice communication, the headset system 5 comprising a headset 15 and a headset adapter 10, the headset adapter being configured to interconnect the headset 15 and host device 20.

The headset 15 comprises at least one earphone 16 having a headset speaker 17. The headset 15 may be a monaural headset having a single earphone 16, or the headset 15 may be a double or stereo headset having two earphones 16, one at each ear, typically interconnected by a headband or neckband. A headset 15 having a single earphone may be held in place by an earphone hook, or a headband or neckband extending over the users head or behind the neck. However, it should be envisaged that the headset may have earphones of any type, such as including in-the-ear type earphones, over the ear type earphones, etc.

The headset 15 further comprises a headset microphone 18. It is envisaged that the headset 15 may comprise more than one microphone 18, for example so as to improve the noise sensitivity for a voice microphone, so as to improve directionality or noise sensitivity of the earphone, etc. Typically, a headset for voice communication will have at least one microphone for voice communication, and the microphone may be provided at a microphone boom or an ear phone extension extending from the users ear towards the users mouth.

The headset 15 furthermore comprises a transceiver 19 configured to connect the headset to further devices, such as the headset adapter, using any protocol, such as any standard wireless interface, including DECT, WLAN, Bluetooth, and Bluetooth LE.

The host device 20 may be any host device 20, such as a computer, including a desk top computer, a laptop computer, etc. such as a smart device, such as a smart phone, a tablet, etc. The host device 20 is configured to execute applications, such as software applications, program applications, etc., typically providing a specific functionality or application for the user of the host device 20. Such applications may include for example softphone applications, voice recognition applications, language or speech learning applications, gaming application, audio or video applications, etc.

The host device 20 has a processor 21 for executing the applications and a host audio interface 23 for interconnecting to an external device, such as to an external audio device, e.g. headset 15.

The headset adapter 10 is configured to interconnect the headset 15 and the host device 20 and allow for communication between the application and a user. The headset adapter 10 comprises an adapter processor 12, a host interface 11 interconnecting the adapter processor 12 and the host device 20, an adapter transceiver 14 configured to establish a wireless communication link 25 with the headset 15, a controller 13 configured to enable and disable the headset microphone 18. The adapter processor 12 is configured to receive a request for headset microphone activation or microphone de-activation from the host interface 11, and in response to receiving the request providing a control signal to the controller 13 to enable or disable the headset microphone 18 accordingly. The controller 13 may thus activate the transceiver 14 to establish the wireless communication link 25 with the headset 15 or the controller 13 may activate the transceiver 14 to terminate the wireless communication link 25 with the headset 15.

It is an advantage of having an audio device, such as a headset, interconnected with the host device in that information from a user to an application being executed at the host device, or vice versa, may be communicated via the headset. A user using a host device expects a seamless workflow when working with the host device, including the ability to receive and provide commands or input from/to an application being executed at the host device 20. In order to save power, a wireless headset typically enters a standby mode when the headset is not positioned in a base station, i.e. is being charged, or when no audio is present or has not been present for a period of time. A user intermittently using the headset during a day may find the need to manually re-activate the headset and the wireless connection cumbersome and impractical. Thus, it is an advantage of the present invention that the headset is activated by the headset adapter upon receiving a request to enable the headset microphone, and in some embodiments also the headset speaker. The request may be received by the headset adapter upon launching or executing an application at the host device, the application enabling input and possibly additionally output via audio.

In some embodiments the host interface 11 is configured for audio transfer, and transfer of data between the host device 20 and the headset adapter 10 via a link may be performed according to an audio protocol, such as an audio class type protocol. The transfer type may be a transfer type facilitating transfer of audio; the transfer type may be isochronous; the transfer may be performed according to an audio protocol, such as an audio class protocol. By using an audio protocol, such as an audio class type link or interface between the host device and the headset adapter, the host device may use a pre-specified driver for the audio class device or may use a pre-specified driver for the specific audio protocol regardless of manufacturer or type of the headset adapter, as long as the headset adapter fulfils the requirements of an audio class device and/or the specific audio protocol.

In some embodiments, the headset adapter is a standard audio device, such as a standard audio class device, and thus, an audio device having no human-interface-device, HID, and the standard device may require a standard audio driver readily available, and may typically require no hardware specific driver to be installed at the host device.

In some embodiments the link between the host device and the headset adapter may be a USB type link and the transfer type may be an isochronous transfer type. The headset adapter interconnecting the headset may be a USB audio class device.

Figure 3:
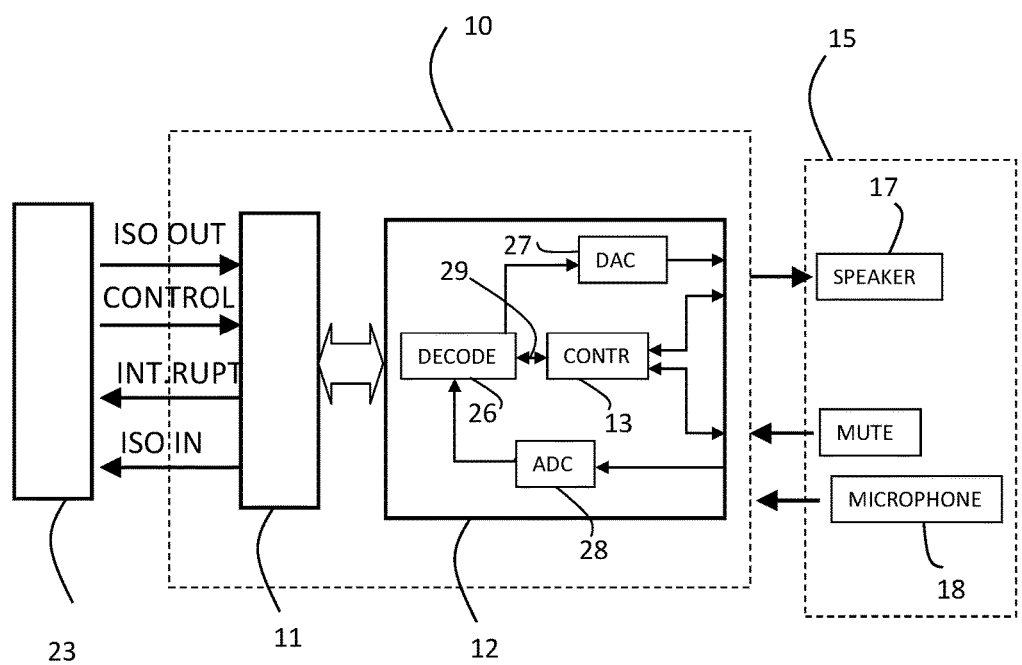
FIG. 3 shows an exemplary headset adapter and the interface to a host device.

In FIG. 3, an exemplary headset system 5 is shown, in which the headset system 5 is shown in more detail illustrating a USB type interface between the host device 20 and the headset adapter 10. The host interface 11 in the headset adapter receives information from the host device via the host audio interface 23. Typically, this communication is provided with isochronous data and a control signal as output from the host device, isochronous data and an interrupt being provided into the host device. The isochronous data and the control signal provided from the host device, and isochronous data and the interrupt provided to the host device are communicated to and from the host device 11 via the host device audio interface to and from the adapter processor 12. The request, control signals and isochronous data from the host device are received at the host interface 11, and the request, control signals and isochronous data are decoded and processed in the adapter processor 12. Isochronous data received via the host interface 11 are sent to the DAC 27 and provided to the headset speaker 17. Furthermore, a host control signal 29 indicating e.g. the volume of the audio may be received at the host interface 11 and provided to the decoder 26 for decoding and processing of the host control signal. The host control signal may furthermore comprise the request for microphone enablement and/or microphone disablement.

Likewise, audio data received from the headset 15 via the wireless link (not shown in FIG. 3) is provided to the ADC 28 and to the adapter controller 13. Furthermore, a headset control signal indicating e.g. a mute request to mute the audio may be received via the wireless link and provided to the adapter controller 13, and the decoder 26 for decoding and processing of the audio and the headset control signal. The decoder 26 may thus both decode and process audio and signals. Audio received via the wireless link is transferred to the host interface, and audio is provided to the host device as isochronous data, while control signals from the adapter controller 13 are provided to the host device via the interrupt.

It should be envisaged that the decoder 26, the controller 13, ADC 28 and DAC 27 may be implemented in a single processor device, or may be implemented as separate interconnected devices.

In an exemplary embodiment, the host interface is a USB type interface. In this particular example, the USB device enumerates with interface 1 being a speaker interface and interface 2 being a microphone interface. Column 2 below is the interface number, and column 3 is the setting.

|  | Interface number | Setting |
| --- | --- | --- |
| Set interface - send audio to headset speaker | 1 | 1 |
| Set interface - send no audio | 1 | 0 |
| Set interface - receive data via microphone | 2 | 1 |
| Set interface - do not receive data via microphone | 2 | 0 |

The interface settings as illustrated above may be decoded by the adapter processor 12, 26 and provided to the controller, or control device, 13 to enable and disable headset microphone and headset speaker accordingly, for example by enabling or turning on the wireless link 25 between the headset adapter 10 and the headset 15 or for example by disabling or turning off the wireless link 25 between the headset adapter 10 and the headset 15.

FIG. 4 is a flow chart showing a method 40 of enabling a headset microphone. In step 41, a request for headset microphone activation is received in the headset adapter; in step 42, the request is decoded in an adapter processor; which in step 43 provides a control signal to the controller. The controller activates the transceiver to establish the wireless communication link with the headset in response to receiving the control signal, and the controller furthermore in response to receiving the control signal in step 44 initiates communication with the wireless headset 15 via a protocol corresponding to the received control signal, such as via a protocol configured to, in the present example, enable headset microphone communication. It should be envisaged that requests to disable the headset microphone, to enable audio communication via the headset speaker, to disable the headset speaker, or any combination thereof, may be processed in the same manner, mutatis mutandis. Although particular embodiments have been shown and described, it will be understood that it is not intended to limit the claimed inventions to the preferred embodiments, and it will be obvious to those skilled in the art that various changes and modifications may be made without departing from the spirit and scope of the claimed inventions. The specification and drawings are, accordingly, to be regarded in an illustrative rather than restrictive sense. The claimed inventions are intended to cover alternatives, modifications, and equivalents.

LIST OF REFERENCE NUMBERS

5 headset system
10 headset adapter
11 host interface
12 adapter processor
13 controller
14 transceiver
15 headset
16 earphone
17 headset speaker
18 headset microphone
19 headset transceiver
20 host device
21 host processor
22 application
23 host audio interface
25 wireless communication link
26 decoder
27 DAC
28 ADC
29 control signal

The invention claimed is:

1. A headset system for voice communication comprising a headset and a headset adapter,
   the headset to be worn by a user, comprising
   at least one earphone having a headset speaker,
   a headset microphone and
   a headset transceiver,
   the headset adapter being configured to interconnect the headset and a host device, the headset adapter including an audio class device and comprising
   an adapter processor,
   a host interface interconnecting the adapter processor and the host device
   an adapter transceiver configured to establish a wireless communication link with the headset, the host interface responsive to a request signal from the processor and intended to authorize the interface to transmit and receive audio with the headset transceiver without user's intervention;
   a controller configured to automatically respond to said request signal enable and disable the headset microphone,
   wherein the adapter processor is configured to receive a request for headset microphone activation or microphone deactivation from the host interface, and in response to receiving the request providing a control signal to the controller to enable or disable the headset microphone accordingly, and activating the transceiver to configure the wireless communication link with the headset.

2. A headset system according to claim 1, wherein the host interface is configured to receive and transmit audio data to and from the host device and wherein the host interface is configured to receiving and sending instructions related to audio, including opening and closing of audio, muting and increasing or decreasing audio volume.

3. A headset system according to claim 1, wherein the host interface is configured to receive the request from the host device, the request being triggered by an application executed on the host device.

4. A headset system according to claim 1, wherein the headset adapter is configured to use a predetermined protocol for establishing the wireless communication link with the headset.

5. A headset system according to claim 4, wherein the predetermined protocol is selected in dependence on the control signal received.

6. A headset system according to claim 1, wherein the headset adapter configures the wireless communication link to transmit audio from the headset microphone to the headset adapter.

7. A headset system according to claim 1, wherein the controller furthermore is configured to enable and disable the headset speaker.

8. A headset system according to claim 1, wherein the headset adapter additionally configures the wireless communication link to transmit audio obtained via the host interface to the headset speaker.

9. A headset system according to claim 1, wherein the wireless communication link is a link according to the DECT or Bluetooth standard.

10. A headset system according to claim 1, wherein the host interface is a Universal Serial Bus, USB, interface, a firewire interface, IEEE 1395 interface or a Lightning interface.

11. A headset system according to claim 1, wherein the headset adapter upon receipt of a request for deactivation of the headset microphone from the host interface, terminates the wireless communication link.

12. A headset adapter configured to interface a headset and a host device, the headset adapter being an audio class device and comprising
   an adapter processor,
   a host interface interconnecting the adapter processor and the host device,
   a transceiver configured to establish a wireless communication link with the headset, a controller configured to enable and disable a headset microphone, wherein the adapter processor is configured to automatically receive a request signal from the processor, for headset microphone activation or microphone deactivation, and in response to receiving the request providing a control signal to the controller to enable or disable the headset microphone accordingly, and activating the transceiver to configure the wireless communication link with the headset without a headset user's intervention but in response to the request signal.

13. A method of enabling or disabling microphone transmission to a host device using a headset adapter, the headset adapter being configured to interconnect a headset having a headset microphone and the host device, the headset adapter including an audio class device and comprising an adapter processor, a host interface interconnecting the adapter processor and the host device, a transceiver configured to establish a wireless communication link with the headset, a controller configured to enable and disable the headset microphone, the method comprising in the headset adapter:

receiving a request signal from the processor, for headset microphone activation or microphone deactivation via the host interface, providing a control signal to the controller to enable or disable the headset microphone, said control signal provided in response to the request signal, to the host device without user assistance and activating the transceiver to configure the wireless communication link with the headset.

14. A method according to claim 13, wherein the controller in response to receiving the control signal establishes communication with the wireless headset via a protocol corresponding to the received control signal.

15. A method according to claim 14, wherein the protocol is configured to enable or disable headset microphone communication.

* * * * *